United States Patent
Sun et al.

(10) Patent No.: US 10,496,974 B2
(45) Date of Patent: Dec. 3, 2019

(54) SECURE TRANSACTIONS WITH CONNECTED PERIPHERALS

(71) Applicant: Intel Corporation, Santa Clara, CA (US)

(72) Inventors: Mingqiu Sun, Beaverton, OR (US); Vincent J. Zimmer, Federal Way, WA (US); Rajesh Poornachandran, Portland, OR (US); Gopinatth Selvaraje, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1029 days.

(21) Appl. No.: 14/668,715

(22) Filed: Mar. 25, 2015

(65) Prior Publication Data
US 2016/0283928 A1    Sep. 29, 2016

(51) Int. Cl.
*G06Q 20/20*    (2012.01)
*G06F 21/60*    (2013.01)
(Continued)

(52) U.S. Cl.
CPC ......... *G06Q 20/204* (2013.01); *G06F 21/606* (2013.01); *G06Q 20/202* (2013.01); *G06Q 20/4097* (2013.01); *H04L 63/04* (2013.01)

(58) Field of Classification Search
CPC ............... G06F 21/6218; G06F 21/604; H04L 63/0428; H04L 63/166; H04L 63/08;
(Continued)

(56) References Cited

U.S. PATENT DOCUMENTS

| 7,213,766 B2 * | 5/2007 | Ryan | G06F 13/385 |
| | | | 235/472.02 |
| 7,565,688 B2 * | 7/2009 | Hall | H04L 63/102 |
| | | | 713/168 |

(Continued)

FOREIGN PATENT DOCUMENTS

| CN | 104376460 A | 2/2015 |
| WO | WO 2014-076686 A2 | 5/2014 |

OTHER PUBLICATIONS

Intel® Data Protection Technology for Transactions, Secure payment and consumer transaction information, Jun. 29, 2015, 4 pages, http://www.intel.com/content/www/us/en/embedded/technology/security/secure-payment-transactions/overview.html.
(Continued)

*Primary Examiner* — Andrew Joseph Rudy
(74) *Attorney, Agent, or Firm* — Schwabe, Williamson & Wyatt, P.C.

(57) ABSTRACT

A point-of-sale device ("POS") is described to include a secure transaction tunnel generator ("STG"). The STG may generate secure tunnels between peripherals attached to the POS and remote network resources. The secure tunnel may be generated using a trusted execution environment ("TEE") of the POS. The STG may be alerted to the need to generate the secure tunnel based on an alert from the peripheral. The STG may execute under a protected environment and may generate two ends of a secure transaction tunnel using the TEE. The STG may also check the peripheral against whitelists and/or blacklists to determine whether the peripheral is allowed or not disallowed to participate in secure transactions. By generating the secure tunnel, the STG may facilitate performance of transactions in such a way that sensitive information is not available to unsecured processes
(Continued)

in the POS. Other embodiments may be described and/or claimed.

25 Claims, 7 Drawing Sheets

(51) Int. Cl.
*H04L 29/06* (2006.01)
*G06Q 20/40* (2012.01)

(58) Field of Classification Search
CPC ... H04L 63/0823; H04L 63/164; H04L 63/20; H04L 63/102; H04L 63/0227; H04L 9/32; H04L 9/321; H04L 9/3213; G06Q 20/204; G06Q 20/20; G06Q 20/202; G06Q 20/40; G06Q 20/10
USPC ....... 705/16, 17, 18; 709/217–223; 713/151, 713/153, 168, 171; 726/1
See application file for complete search history.

(56) References Cited

U.S. PATENT DOCUMENTS

| | | | | |
|---|---|---|---|---|
| 7,847,959 B2* | 12/2010 | Love | H04L 63/162 | 358/1.14 |
| 8,032,652 B2* | 10/2011 | Iyer | H04L 67/104 | 709/234 |
| 8,181,262 B2* | 5/2012 | Cooper | H04K 1/00 | 709/223 |
| 8,239,531 B1* | 8/2012 | Bellovin | H04L 63/0272 | 709/203 |
| 8,316,237 B1* | 11/2012 | Felsher | H04L 9/0825 | 380/282 |
| 8,346,976 B2* | 1/2013 | Bouthemy | H04L 12/2834 | 709/238 |
| 8,554,586 B2* | 10/2013 | Barth | G06Q 10/00 | 235/114 |
| 8,560,833 B2* | 10/2013 | Kumar | H04L 63/168 | 709/238 |
| 8,606,911 B2* | 12/2013 | Raleigh | H04L 12/14 | 709/224 |
| 8,745,372 B2* | 6/2014 | Orsini | H04L 63/029 | 713/151 |
| 8,745,379 B2* | 6/2014 | Orsini | H04L 63/029 | 380/277 |
| 8,746,556 B2* | 6/2014 | Dixon | G06Q 20/027 | 235/375 |
| 8,776,166 B1* | 7/2014 | Erickson | H04L 63/083 | 726/1 |
| 8,856,869 B1* | 10/2014 | Brinskelle | H04L 63/08 | 726/12 |
| 8,856,910 B1* | 10/2014 | Rostami-Hesarsorkh | H04L 63/1408 | 726/12 |
| 8,893,009 B2* | 11/2014 | Raleigh | H04M 15/00 | 715/736 |
| 8,914,674 B2* | 12/2014 | Shah | G06F 21/10 | 714/27 |
| 9,027,102 B2* | 5/2015 | Katzer | G06F 21/6245 | 726/7 |
| 9,185,079 B2* | 11/2015 | Saxena | H04L 63/029 | |
| 9,256,875 B2* | 2/2016 | Dixon | G06Q 20/027 | |
| 9,268,959 B2* | 2/2016 | Paczkowski | G06F 21/74 | |
| 9,292,875 B1* | 3/2016 | Candelore | G06Q 40/12 | |
| 9,317,847 B2* | 4/2016 | Candelore | G06Q 20/3224 | |
| 9,355,424 B2* | 5/2016 | Candelore | G06Q 40/12 | |
| 9,372,988 B2* | 6/2016 | Thadikaran | H04L 63/145 | |
| 9,407,612 B2* | 8/2016 | Sood | H04L 63/06 | |
| 9,602,303 B2* | 3/2017 | Millet | H04L 12/42 | |
| 9,609,458 B2* | 3/2017 | Ramanna | H04W 8/205 | |
| 9,680,795 B2* | 6/2017 | Buruganahalli | H04L 63/1416 | |
| 9,705,849 B2* | 7/2017 | Sood | H04L 63/061 | |
| 9,716,659 B2* | 7/2017 | Dillon | H04L 47/22 | |
| 9,799,232 B2* | 10/2017 | Sako | G09B 19/0092 | |
| 9,832,207 B2* | 11/2017 | Rubakha | H04L 63/123 | |
| 9,853,917 B2* | 12/2017 | Desai | H04L 49/25 | |
| 9,853,948 B2* | 12/2017 | Sun | H04L 63/029 | |
| 9,916,454 B2* | 3/2018 | Thadikaran | G06F 21/575 | |
| 10,049,394 B2* | 8/2018 | Ballesteros | G06Q 20/12 | |
| 10,116,447 B2* | 10/2018 | Gordon | H04L 9/3228 | |
| 10,178,087 B2* | 1/2019 | Broumas | H04L 63/083 | |
| 10,182,040 B2* | 1/2019 | Hu | G06F 21/53 | |
| 10,185,669 B2* | 1/2019 | Hans | G06F 12/1408 | |
| 10,187,363 B2* | 1/2019 | Smirnoff | H04L 63/062 | |
| 10,334,431 B2* | 6/2019 | Pogorelik | H04W 12/04 | |
| 2008/0144075 A1 | 6/2008 | Love | | |
| 2009/0261162 A1* | 10/2009 | Kargman | G06Q 20/204 | 235/380 |
| 2012/0324216 A1 | 12/2012 | Sun et al. | | |
| 2013/0339243 A1 | 12/2013 | Dixon et al. | | |
| 2016/0014159 A1* | 1/2016 | Schrecker | H04L 63/0869 | 726/1 |

OTHER PUBLICATIONS

International Search Report and Written Opinion dated Jul. 15, 2016 for International Application No. PCT/US2016/019285, 14 pages.

* cited by examiner

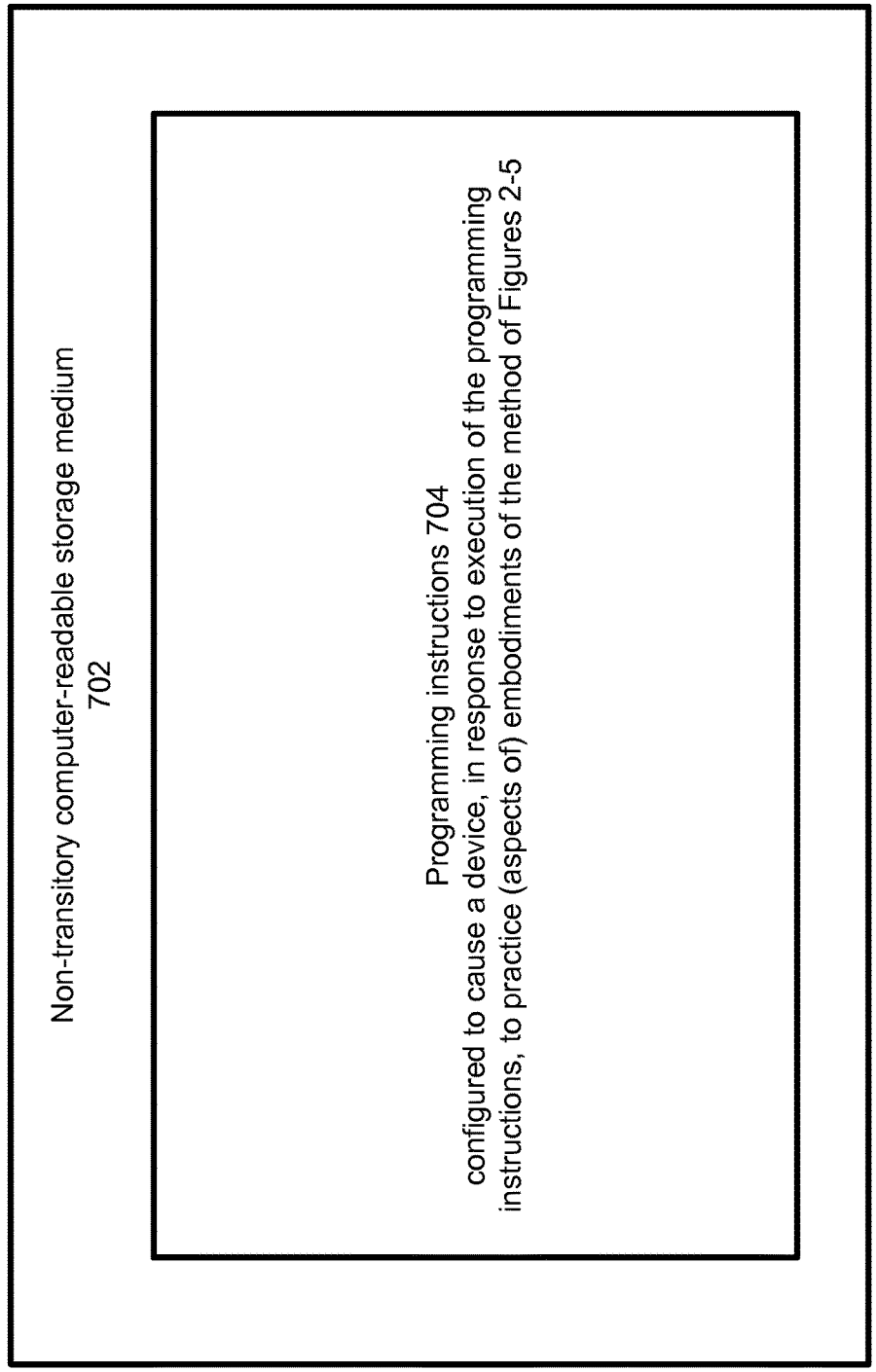

SECURE TRANSACTIONS WITH CONNECTED PERIPHERALS

TECHNICAL FIELD

The present disclosure relates to the field of data processing, in particular, to apparatuses, methods and storage media associated with facilitating secure transactions with connected peripherals.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

As e-commerce becomes more and more popular in people's lives, it becomes more and more imperative to secure transaction processes in order to prevent sensitive information, such as credit card numbers or identity information, from falling into the wrong hands. However, many financial transaction systems suffer from vulnerabilities that make such protection difficult.

One such vulnerability is the use of point-of-sale computing devices ("POSes") along with peripherals for obtaining financial information. For example, many retail environments utilize credit card readers that are attached as peripherals (either through a wired or wireless connection) to POSes, such as computerized cash registers. In order to perform a retail transaction, a customer or a worker may scan a credit card of the customer in the credit card reader, which may send credit card information to the POS. The POS may, in turn, communicate with the customer's financial institution in order to process payment.

Unfortunately, systems such as these are vulnerable to attacks from within the POS. Many such POS store credit card or other identifying information in unencrypted form in internal storage or memory, or to perform keylogging to obtain information. If the POS were to contract malware, the malware may be able to read and transmit the sensitive credit card information to a malicious third party. Such attacks are not only possible, but actually documented in the real world, with millions of dollars stolen in the last few years. Existing systems have attempted to address this vulnerability, such as by requiring end-to-end encryption between peripherals and financial institutions, but such systems can require updates to peripheral hardware, which is impractically expensive to companies with many retail outlets. Other systems use hardened dongles to provide security without requiring updates to peripherals, but even these systems may be too expensive to implement on a large scale.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

FIG. 7 illustrates an example storage medium with instructions configured to enable an apparatus to practice various aspects of the present disclosure in accordance with various embodiments.

DETAILED DESCRIPTION

Figure 1:
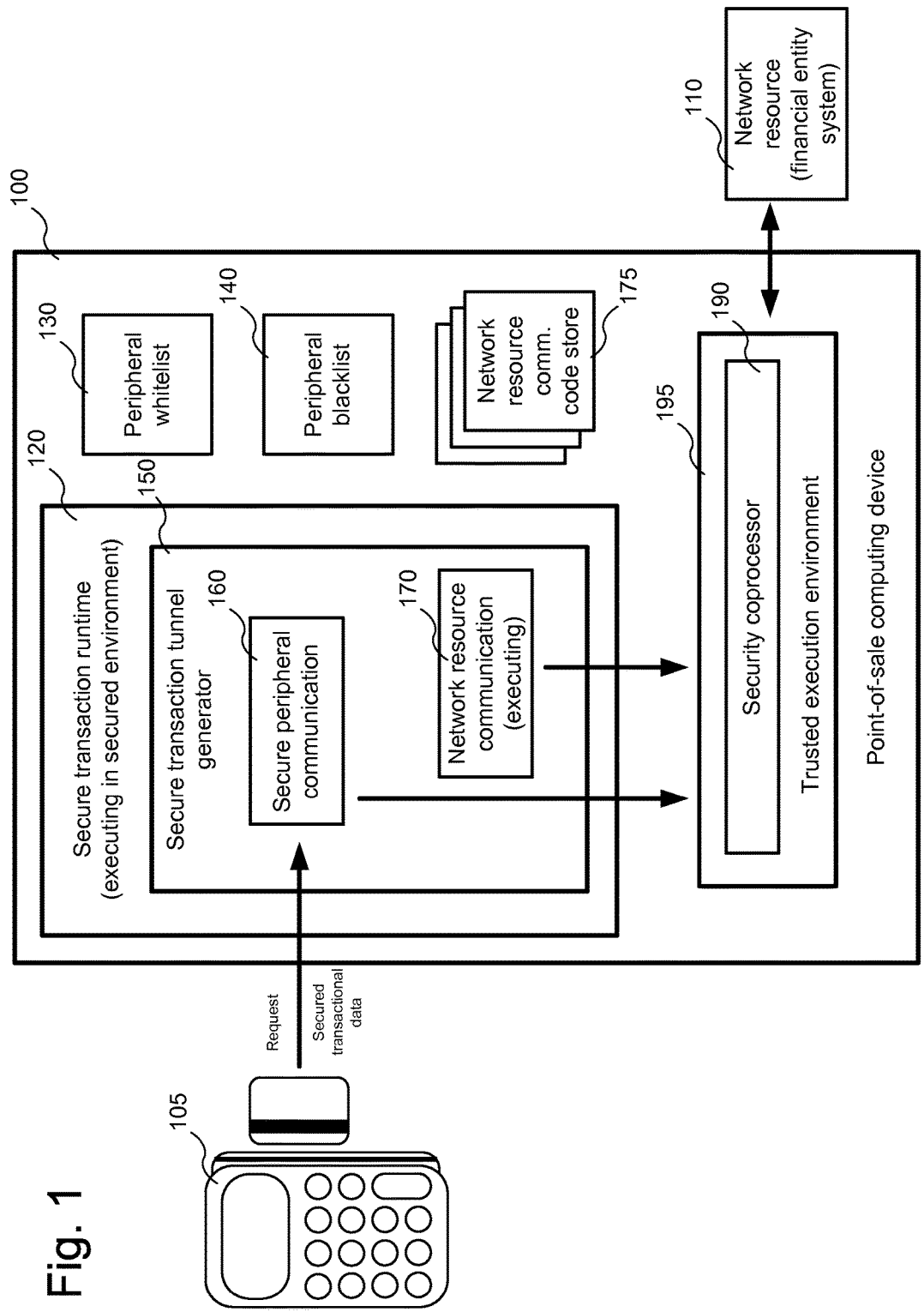
FIG. 1 illustrates an example arrangement for a point-of-sale computing device including a secure transaction tunnel generator of the present disclosure, in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. As described herein, the term "logic" and "module" may refer to, be part of, or include a System on a Chip, as described below.

In various embodiments, a POS may be configured to include a secure transaction tunnel generator ("STG"). The STG may be configured to facilitate the generation of secure tunnels between peripherals attached to the POS and remote network resources. For example, an STG may be configured to generate a secure tunnel between a credit card reader attached to the POS and a server of a bank or other financial institution. The secure tunnel may be generated using a trusted execution environment ("TEE") of the POS. In various embodiments, the STG may be configured to be alerted to the need to generate the secure tunnel based on an alert from the peripheral or the POS itself. The STG may then execute under a protected environment, such as a system management mode ("SMM") environment. The STG may thereafter generate two ends of a secure transaction tunnel using the TEE. The STG may also check the peripheral against whitelists and/or blacklists to determine whether the peripheral is allowed or not disallowed to participate in secure transactions. In various embodiments, by generating the secure tunnel using the TEE, the STG may facilitate performance of transactions between the peripheral and a network resource in such a way that sensitive information, such as financial or identity information, is not available to unsecured processes in the POS. This may better prevent malicious access to this sensitive information, and may thus reduce the number of security breaches of customer information.

Referring now to FIG. 1, an example arrangement for a point-of-sale computing device 100 ("POS 100") including a secure transaction tunnel generator 150 ("STG 150") is illustrated in accordance with various embodiments. In various embodiments, the POS 100 may be connected to a peripheral 105. In the illustrated embodiments, peripheral 105 may be a credit card reader, but in various embodiments, the peripheral 105 may include other devices, computers, or machines for performance of transactions, such as bar code readers, cameras, fingerprint readers, check readers, etc. The POS 100 may be connected to the peripheral 105 through various communication methods, such as, but not limited to, Universal Serial Bus (USB) connections, Ethernet connections, WiFi., etc.

In various embodiments, the POS 100 may also be configured to connect, such as through a wired or wireless network connections, to a remote network resource 110. In various embodiments, the network resource 110 may include a various servers or services to perform networked transactions, such as, for example, credit card processing servers, banking servers, identity recognition servers, etc. Thus, in various embodiments, while techniques are described herein with reference to financial transactions, and in particular with reference to performance of credit card payments, it may be recognized that techniques described herein may be performed for facilitation of other transactions, such as identification or recognition transactions, photo-based transactions, etc.

In various embodiments, the POS 100 may include the STG 150, which may be configured to generate secure transaction tunnels between the peripheral 105 and the network resource 110. In various embodiments, the STG 150 may be configured to generate secure transaction tunnels through a trusted execution environment 190 ("TEE 190"). The TEE 190 may, in various embodiments, include an execution environment in which processes and/or data are protected from access by processes outside of the TEE 190. In various embodiments, the TEE 190 may include a security coprocessor 195, which may be configured to perform execution of processes in the TEE 190 such that the processes are protected. Particular implementations of the TEE 190 may be understood by those of ordinary skill.

In various embodiments, the STG 150 may be configured to generate the secure transaction tunnel through generation of a secure connection between the TEE 190 and the peripheral 105 as well as generation of a secure connection between the TEE 190 and the network resource 110. Thus, through transmission of sensitive data through the two secure connections, the STG 150 may generate the secure tunnel from the peripheral 105 to the network resource 110 through the TEE 190. In various embodiments, the STG 150 may include one or more modules for generation of the secure connections. Thus, the STG 150 may include a secure peripheral communication module 160 ("SPC 160"). The SPC 160 may be configured to establish the secure connection between the TEE 190 and the peripheral 105. In various embodiments, the SPC 160 may be configured to facilitate these communications by acting as an intermediary between the peripheral 105 and the TEE 190. In various embodiments, the SPC 160 may perform encryption of communications between the peripheral 105 and the TEE 190, and/or may receive unencrypted communications from the peripheral 105 and may encrypt these communications before they are sent on to the TEE 190 and/or the network resource 110. In other embodiments, communications between the peripheral 105 and the TEE 190 may not be facilitated by the SPC 160. Instead, in various embodiments, the security coprocessor 195 of the TEE 190 may execute peripheral communications processes through which a secure connection may be made between the peripheral 105 and the TEE 190.

In various embodiments, the STG 150 may execute in a secure transaction runtime 120 ("STR 120"). For example, in various embodiments, the secure transaction runtime may include a Java™ runtime and the STG 150 may be implemented with Java™ bytecode, which may be configured to execute in that Java™ runtime. In other embodiments, other implementations may be utilized. In various embodiments, the STR 120, and thus by extension the STG 150, may be configured to execute in a secured environment, such as a secure management mode environment ("SMM", not illustrated). In various embodiments, the SMM may be an environment where processes may be executed at a higher level of privilege than other processes and without inspection by other processes, as may be understood. In various embodiments, execution in SMM may utilize a CPU mode that is protected from ring 0 operating system kernel execution. The SMM may allow for leveraging performance of the CPU by time slicing execution with the main operating system. Alternate embodiments, such as Converged Security Management Engine ("CSME"), may utilize a separate embedded CPU subsystem. In other embodiments, the STG 150 may execute in other secure environments, as may be understood.

In various embodiments, the POS 100 may be configured to proceed with execution of the STG 150 in the SMM upon receipt of a request from the peripheral 105 to perform a transaction. For example, in various embodiments, the POS 100 may be configured to enter the SMM and proceed with execution of the STG 150 in the STR 120 upon receipt of an interrupt, e.g., an USB interrupt, from the peripheral 105. Thus, from the first indication that a transaction is requested by the peripheral, the STG 150 may be executed in a protected and privileged environment. In various embodiments, by executing the STG 150 in the STR 120 in the SMM, the STG 150 may be provided the ability to generate the secure transaction tunnel with reduced concern of tampering by potential malicious processes that may exist elsewhere in the POS 100. In other embodiments, other mechanisms for receiving a request from the peripheral 105 may be utilized, such as a megatask of a CSME. In other embodiments, a request may be received through actions of an embedded controller in the POS 100 which may intercept the request from the peripheral 105 and proceed with secure transaction tunnel generation techniques described herein.

In various embodiments, the STG 150 may also include a network resource communication module 170 ("NRC 170") which may be configured to perform communications between the TEE 190 and the network resource 110. In various embodiments, the NRC 170 may be configured to communicate with a secure communication protocol known to the network resource, such as, for example, a sigma protocol. The NRC 170 may, in various embodiments, be implemented through bytecode configured to execute on the STR 120. In various embodiments, the bytecode for the NRC 170 may be obtained from a network resource communication code store 175 ("NRS 175"). The NRS 175 may be configured to maintain bytecode for various network resources 110, so that different NRC 170s may be utilized depending on the particular network resource 110 being communicated with. In various embodiments, by storing code for different NRC 170s, the STG 150 may be facilitated in communicating with various network resources without requiring extensive re-coding of the STG 150 to include new communications code. Additionally, by implementing the various NRC 170s in interpretable bytecode, the POS 100 may be facilitated in receiving NRC 170 code from financial institutions (or other institutions with which network resources may be associated) without requiring that the code be written for the particular hardware resources of the POS 100.

In various embodiments, the STG 150 may additionally be configured to determine whether a peripheral is allowed or not disallowed to perform secure communications. Thus, in various embodiments, the STG 150 may compare the peripheral 105 to a peripheral whitelist 130 of approved peripherals and/or a peripheral blacklist 140 of unapproved peripherals to make such a determination. In various embodiments, such lists may be provided by a third party, such as an approval server and/or financial institutions.

Figure 2:
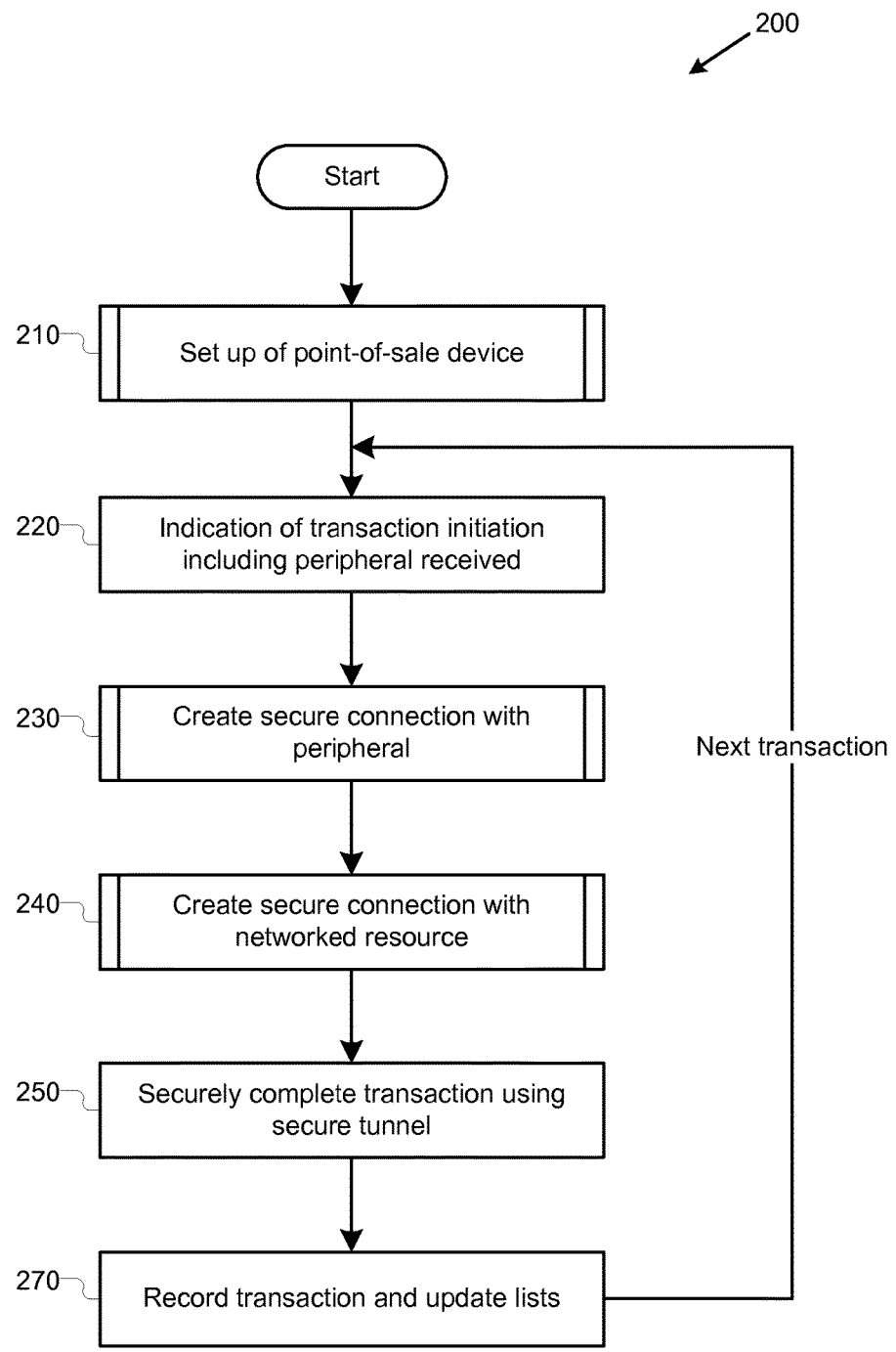
FIG. 2 illustrates an example process for performance of a transaction using a generated secure transaction tunnel, in accordance with various embodiments.

Referring now to FIG. 2, an example process 200 for performance of a transaction using a generated secure transaction tunnel is illustrated in accordance with various embodiments. While FIG. 2 illustrates particular operations in a particular order, in various embodiments the operations may be combined, split into parts, and/or omitted. The process may begin at operation 210, where the POS 100 may be set up for facilitation of secure transactions. Particular embodiments of the process of operation 210 may be described below with reference to process 300 of FIG. 3. Next, at operation 220, indication of a transaction including the peripheral 105 being initiated by a user, such as retail worker, may be received. For example, a user may swipe a credit card in a credit card reader or may scan a photo of a face of a customer, resulting in a notification being generated. In other embodiments, instead of initiating the transaction using the peripheral, the user may initiate a transaction using the POS 100 itself, such as by entering a price into retail software or scanning a bar code.

Next, at operation 230, the STG 150 may generate a secure connection between the peripheral 105 and the TEE 190. Particular embodiments of the process of operation 230 may be described below with reference to process 400 of FIG. 4. Next, at operation 240, the STG 150 may generate a secure connection between the TEE 190 and the network resource 110. Particular embodiments of the process of operation 240 may be described below with reference to process 500 of FIG. 5. Upon generation of the secure connections at operations 230 and 240, the secure tunnel may be generated between the peripheral 105 and the network resource 110. Thus, at operation 250, the peripheral 105 and the network resource 110 may securely complete the transaction initiated at operation 210 over the secure transaction tunnel. At operation 270, the STG 150 may record the completed transaction. In various embodiments, logging of transactions may be performed in order that, if subsequent security issues are discovered with the peripheral 105, the peripheral 105 may be added to the peripheral blacklist 140. Thus, at operation 270, the STG 150 may also add the peripheral 105 to the peripheral blacklist 140, such as if security issues were discovered during performance of the secure transaction. The process may then continue to operation 220 for the next initiated transaction.

Figure 3:
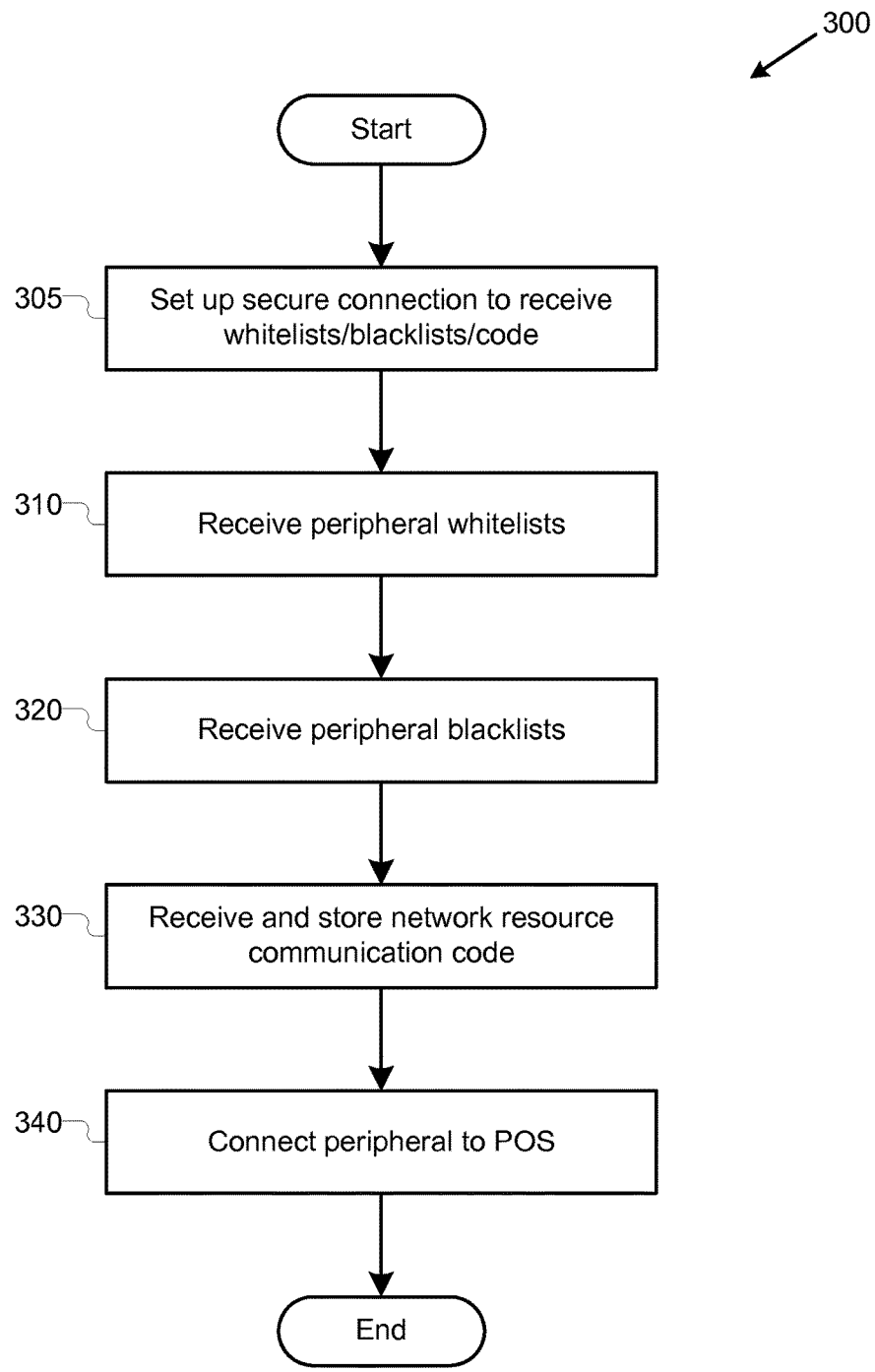
FIG. 3 illustrates an example process for setting up a point-of-sale device to perform secure transaction tunnel generation, in accordance with various embodiments.

Referring now to FIG. 3, an example process 300 for setting up the POS 100 to perform secure transaction tunnel generation is illustrated in accordance with various embodiments. In various embodiments, process 300 may be performed to implement, in whole or in part, operation 210 of process 200 of FIG. 2. While FIG. 3 illustrates particular operations in a particular order, in various embodiments the operations may be combined, split into parts, and/or omitted. The process may begin at operation 305, where the POS 100 may set up one or more secure connections to receive information used to perform secure transaction tunnel generation, including whitelists, blacklists, and network resource communication code. In various embodiments, these secure connections may be set up with financial institutions or other trusted entities such that this sensitive information may be received with less concern that it will be compromised or manipulated by a malicious third party.

Next, at operation 310, the POS 100 may receive one or more peripheral whitelists 130. In various embodiments, these peripheral whitelists 130 may include identifying information for one or more peripherals that may be approved to be utilized with the STG 150. In various embodiments, one or more of the peripheral whitelists 130 may be associated with particular institutions, such as financial institutions. Thus, a financial institution may provide a peripheral whitelist 130 of approved peripherals that may be used to perform transactions with that institution's network resources. In other embodiments, one or more of the peripheral whitelists 130 may be provided to approve peripherals generally to work with the STG 150, such that the provided peripheral whitelist 130 includes those peripherals 105 that are known to interact in secure and/or predictable ways with the STG 150. In various embodiments, the peripheral whitelists 130 provided at operation 310 may be provided by one or more networked services external to the POS 100.

Next, at operation 320, the POS 100 may receive one or more peripheral blacklists 140. In various embodiments, these peripheral blacklists 140 may include identifying information for one or more peripherals that may be unapproved to be utilized with the STG 150. In various embodiments, one or more of the peripheral blacklists 140 may be associated with particular institutions, such as financial institutions. Thus, a financial institution may provide a peripheral blacklist 140 of unapproved peripherals. In other embodiments, one or more of the peripheral blacklists 130 may be provided to disapprove peripherals to work with the STG 150, such as peripherals 105 that are known to represent security weak points or which cannot interact stably with the STG 150. In various embodiments, the peripheral blacklists 140 provided at operation 320 may be provided by one or more networked services external to the POS 100.

Next, at operation 330 the POS 100 may receive code for one or more NRC 170s and may store this code in the NRS 175. In various embodiments, this code may be provided by one or more financial institutions (or other institutions) in order to facilitate the specific communications protocols that are desired by the institutions for interactions with their network resources. In other embodiments, a central repository of NRC 170 code may be provided and may periodically update the POS 100 with NRC 170 code to be stored in the NRS 175. Finally, at operation 340, a user may connect the peripheral 105 to the POS 100. In various embodiments, such connection may include wired or wireless connections, as well as direct and/or networked connections, as may be understood. The process may then end.

Figure 4:
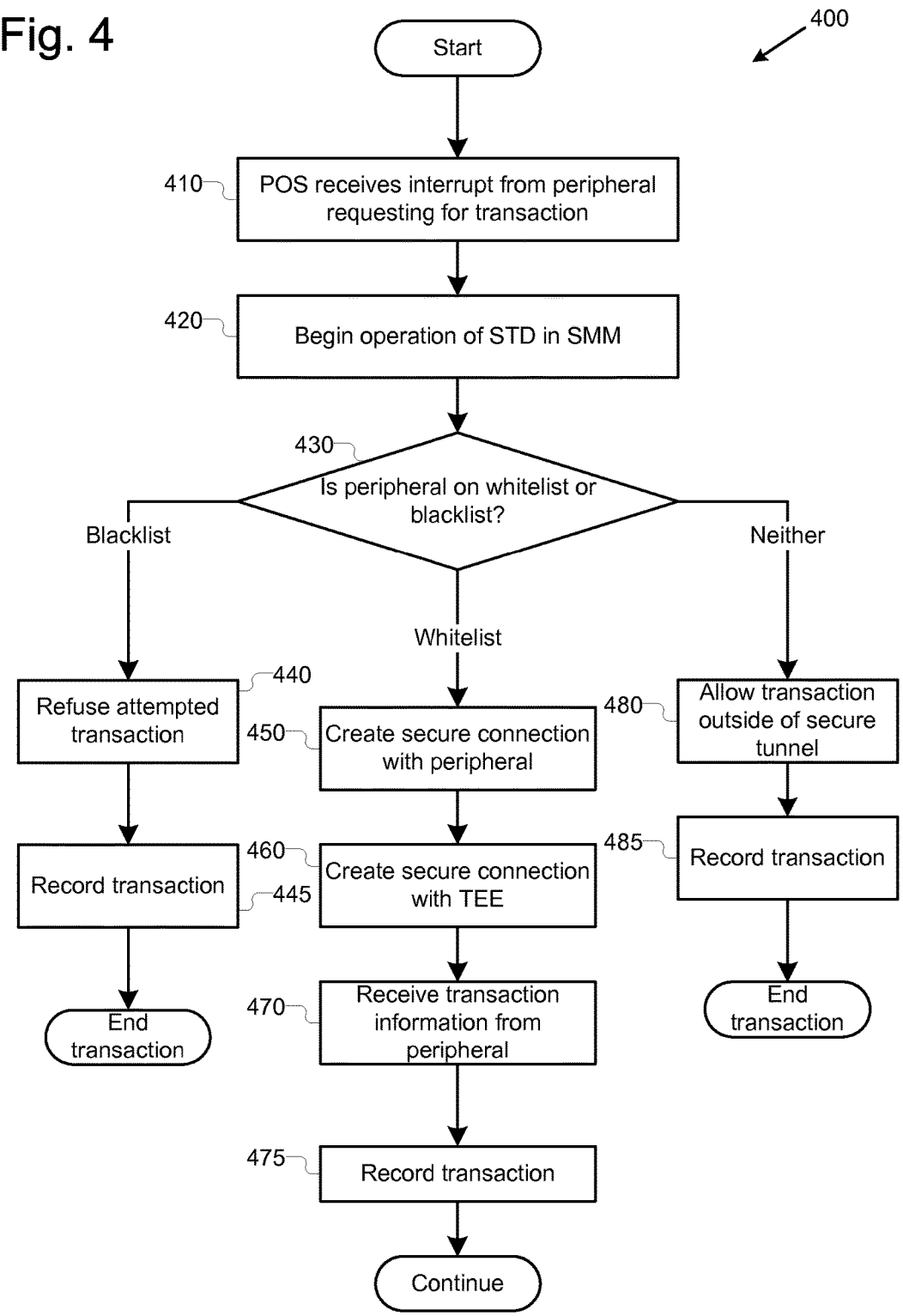
FIG. 4 illustrates an example process for generating a secure connection between a peripheral and the point-of-sale device, in accordance with various embodiments.

Referring now to FIG. 4, an example process 400 for generating a secure connection between a peripheral and the point-of-sale device is illustrated in accordance with various embodiments. In various embodiments, process 400 may be performed to implement, in whole or in part, operation 230 of process 200 of FIG. 2. While FIG. 4 illustrates particular operations in a particular order, in various embodiments the operations may be combined, split into parts, and/or omitted. The process may begin at operation 410, where the POS 100 may receive an interrupt indicating that the peripheral 105 has requested communication with the POS 100. In various embodiments, this interrupt may be a USB-bus interrupt. In other embodiments, another indication from the peripheral 105 may be received. Next, at operation 420, POS 100 may enter SMM, and the STG 150 may begin operation in the SMM. In various embodiments, as discussed above, the STG 150 may operate as interpreted bytecode in the STR 120.

Next, at decision operation 430, the STG 150 may determine whether the peripheral 105 that has requested communication is on the peripheral whitelist 130 or the peripheral blacklist 140. If the peripheral 105 is on the peripheral blacklist 140, then at operation 440, the STG 150 may refuse the attempted transaction, and the process may end. By refusing the transaction because the peripheral is blacklisted, the STG 150 may avoid potentially insecure transactions from occurring and may protect the POS 100 (as well as customers using the POS 100) from having their information compromised. After refusing the transaction, at operation 445, the STG 150 may record the attempted transaction, similarly to operation 270 of FIG. 2 above.

If, instead, the peripheral 105 is listed on the peripheral whitelist 130, then at operation 450, the SPC 160 may create a secure connection with the peripheral 105. In various embodiments, the SPC 160 may create an encrypted connection with the peripheral 105 if encrypted communications are supported by the peripheral 105. After the secure connection is created at operation 450, then at operation 460, the SPC 160 may create a secure connection with the TEE 190. In various embodiments, this connection may be encrypted or otherwise secured to avoid snooping or other compromise by processes within the POS 100. Next, at operation 470, the SPC 150 may receive secured transaction information from the peripheral 105. In various embodiments, this transaction information may include financial or identifying information for a customer associated with the transaction. In various embodiments, this transaction information may include an identification of the network resource 110 with which the transaction is supposed to take place. In various embodiments, by receiving this information after a secure connection has been created, the STG 150 better facilitates a secure transaction with the network resource. After operation 470, the STG 150 may continue to process 500 of FIG. 5 (operation 240 of FIG. 2). Note that while the transaction is not illustrated as being recorded in FIG. 4 after operation 470, it will be recorded upon completion of operation 270 of FIG. 2.

If, instead, the peripheral 105 is not on either the peripheral whitelist 130 or the peripheral blacklist 140, then at operation 480, the POS 100 may allow the transaction to take place, but may not utilize a secure transaction tunnel provided by STG 150. After completion of the transaction, at operation 485, the STG 150 may record the transaction, similarly to operation 270 of FIG. 2 above. The process may then end. It may be noted that, in alternative embodiments, if the peripheral 105 is not on either the peripheral whitelist 130 or the peripheral blacklist 140, process 400 may proceed with operation 450 and allow the transaction to proceed using a secured transaction tunnel, rather than proceeding with an unsecured transaction.

Figure 5:
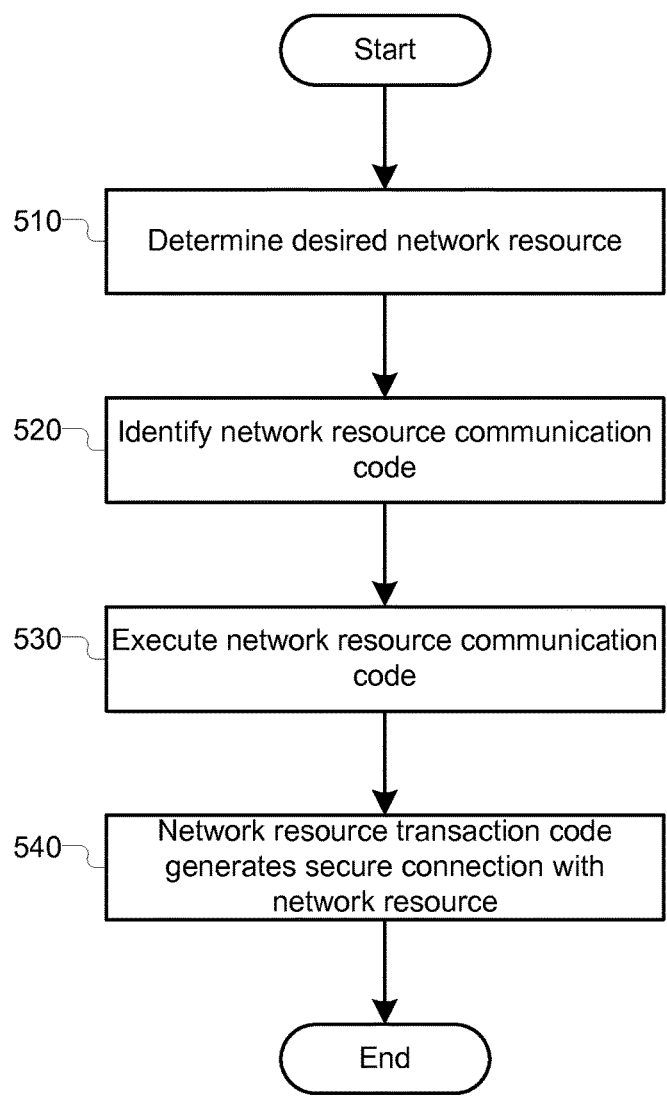
FIG. 5 illustrates an example process for generating a secure connection between a the point-of-sale device and a network resource, in accordance with various embodiments.

FIG. 5 illustrates an example process for generating a secure connection between a point-of-sale device and a network resource, in accordance with various embodiments. In various embodiments, process 500 may be performed to implement, in whole or in part, operation 240 of process 200 of FIG. 2. The process may begin at operation 510, where the STG 150 may determine, from the received transaction information, what the desired network resource 110 is. For example, the STG 150 may determine a financial or other institution with which the transaction is to occur, and/or a server or service to be communicated with. Next, at operation 520, the STG 150 may identify, from the code in the NRS 175, which code should be used for the NRC 170 to communicate with the network resource 110. At operation 530, the STG 150 may execute the identified NRC 170, such as by interpreting the code for the NRC 170 in the STR 120.

At operation 540, the NRC 170 may generate a secure connection between the TEE 190 and the network resource 110, thus generating the secure transaction tunnel between the peripheral 105 and the network resource 110. In various embodiments, the NRC 170 may provide code executing in the TEE 190 with appropriate credentials provisioned by an entity associated with the network resource 110, such as a financial institution application. For example, the NRC 170 may provide a private key that can be used for encryption/decryption of messages with the network resource 190. In other embodiments, the TEE 190 may store whitelists and/or blacklist information and perform list checks. In some embodiments, the TEE 190 may perform logging transactions as well. Additionally, in various embodiments, after the verification has been performed by the STG 150, subsequent interrupts and communication received by the peripheral 105 may be processed outside of the secure tunnel and/or may be processed by traditional OS processes, given that security has been verified with the peripheral 105. After operation 540, the process may then end.

Figure 6:
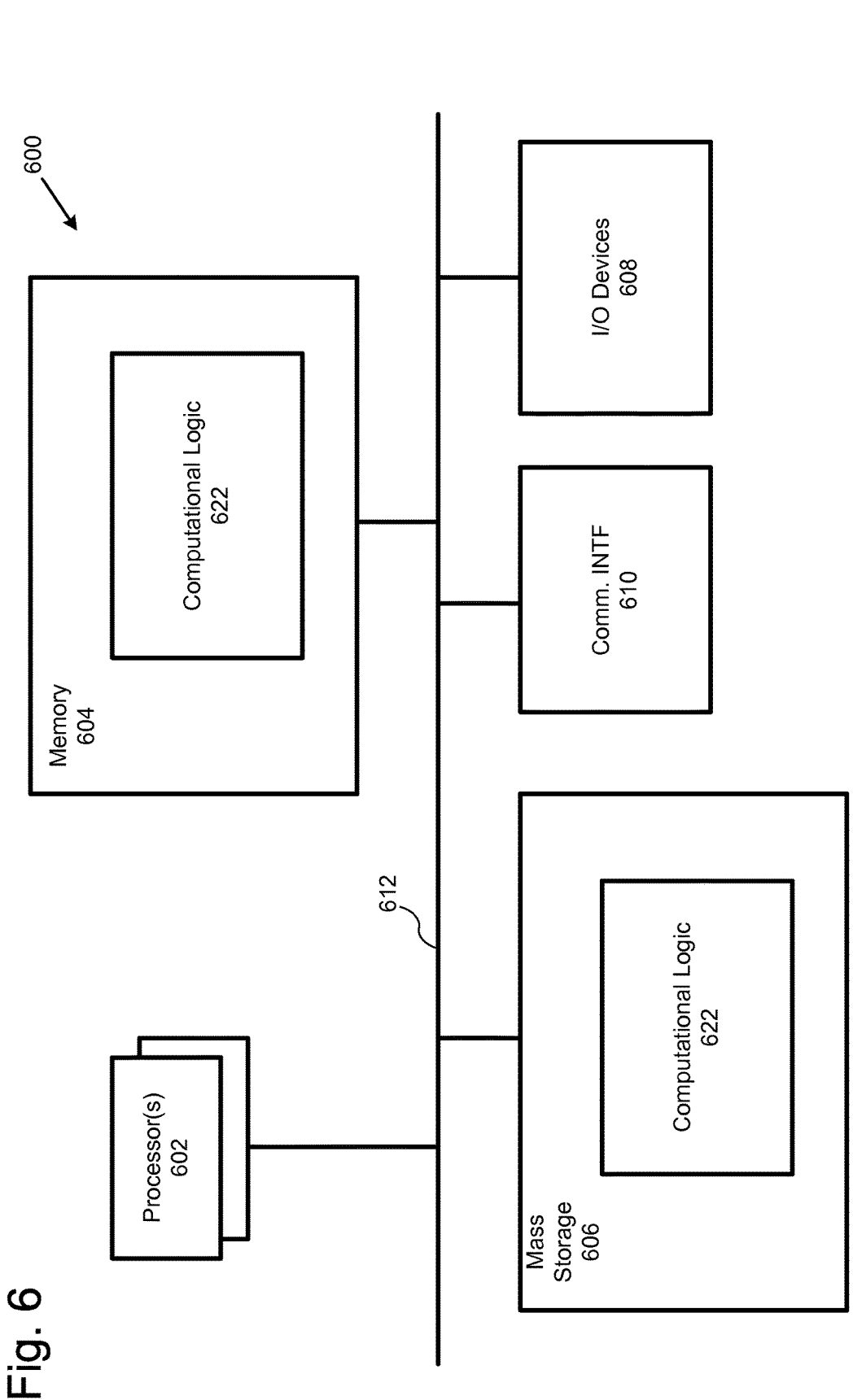
FIG. 6 illustrates an example computing environment suitable for practicing various aspects of the present disclosure in accordance with various embodiments.

Referring now to FIG. 6, an example computer suitable for practicing various aspects of the present disclosure, including processes of FIGS. 2-5, is illustrated in accordance with various embodiments. As shown, computer 600 may include one or more processors or processor cores 602, and system memory 604. For the purpose of this application, including the claims, the terms "processor" and "processor cores" may be considered synonymous, unless the context clearly requires otherwise. Additionally, computer 600 may include mass storage devices 606 (such as diskette, hard drive, compact disc read only memory (CD-ROM) and so forth), input/output devices 608 (such as display, keyboard, cursor control, remote control, gaming controller, image capture device, and so forth) and communication interfaces 610 (such as network interface cards, modems, infrared receivers, radio receivers (e.g., Bluetooth, Wi-Fi, Near Field Communications, Radio-frequency identification, and so forth). The elements may be coupled to each other via system bus 612, which may represent one or more buses. In the case of multiple buses, they may be bridged by one or more bus bridges (not shown).

Each of these elements may perform its conventional functions known in the art. In particular, system memory 604 and mass storage devices 606 may be employed to store a working copy and a permanent copy of the programming instructions implementing one or more of the modules shown in FIG. 1, and/or the operations associated with techniques shown in FIGS. 2-5, collectively referred to as computing logic 622. The various elements may be implemented by assembler instructions supported by processor(s) 602 or high-level languages, such as, for example, C, that can be compiled into such instructions. In various embodiments, the system memory 604 or mass storage 606 may include various memory implementations, including integrated flash memory, such as in a System on a Chip, a USB flash drive, SD Card, on SATA SSD, etc.

The permanent copy of the programming instructions may be placed into permanent storage devices 606 in the factory, or in the field, through, for example, a distribution medium (not shown), such as a compact disc (CD), or through communication interface 610 (from a distribution server (not shown)). In embodiments, the programming instructions may be stored in one or more computer readable non-transitory storage media. In other embodiments, the programming instructions may be encoded in transitory storage media, such as signals.

The number, capability and/or capacity of these elements 610-612 may vary. Their constitutions are otherwise known, and accordingly will not be further described.

FIG. 7 illustrates an example least one computer-readable storage medium 702 having instructions configured to practice all or selected ones of the operations associated with the techniques earlier described, in accordance with various embodiments. As illustrated, least one computer-readable storage medium 702 may include a number of programming instructions 704. Programming instructions 704 may be configured to enable a device, e.g., computer 600, in response to execution of the programming instructions, to perform, e.g., various operations of processes of FIGS. 2-5, e.g., but not limited to, to the various operations performed to perform secure transaction tunnel generation techniques described herein In alternate embodiments, programming instructions 704 may be disposed on multiple least one computer-readable storage media 702 instead.

Referring back to FIG. 6, for one embodiment, at least one of processors 602 may be packaged together with a memory having computational logic 622 configured to practice aspects of processes of FIGS. 2-5. For one embodiment, at least one of processors 602 may be packaged together with a memory having computational logic 622 configured to practice aspects of processes of FIGS. 2-5 to form a System in Package (SiP). For one embodiment, at least one of processors 602 may be integrated on the same die with a memory having computational logic 622 configured to practice aspects of processes of FIGS. 2-5. For one embodiment, at least one of processors 602 may be packaged together with a memory having computational logic 622 configured to practice aspects of processes of FIGS. 2-5 to form a System on Chip (SoC). For at least one embodiment, the SoC may be utilized in, e.g., but not limited to, a computing tablet. (e.g., Wi-Fi, Blue Tooth, Blue Tooth Low Energy, Near Field Communications, Radio-frequency identification (RFID), etc.) and other components as necessary to meet functional and non-functional requirements of the system.

Computer-readable media (including at least one computer-readable media), methods, apparatuses, systems and devices for performing the above-described techniques are illustrative examples of embodiments disclosed herein. Additionally, other devices in the above-described interactions may be configured to perform various disclosed techniques. Particular examples of embodiments, described herein include, but are not limited to, the following:

Example 1 may include an apparatus for facilitating secure transactions. The apparatus may include one or more computer processors and a trusted execution environment (TEE) to execute processes on the one or more computing processors in a protected manner that prevents the processes being executed in the TEE from being accessed by processes executing outside of the TEE. The apparatus may also include a security tunnel generator to. The security tunnel generator may receive a request from a peripheral to perform a transaction with an external network resource and generate a secure tunnel coupling the peripheral and the network resource, using the TEE.

Example 2 may include the apparatus of example 1, wherein the security tunnel generator may be to generate the secure tunnel through generation of a secure connection between the TEE and the peripheral and generation of a secure connection between the TEE and the network resource.

Example 3 may include the apparatus of example 2, wherein the generation of a secure connection between the TEE and the networked service may include generation of a secure connection using a communication protocol associated with the network resource.

Example 4 may include the apparatus of example 3, wherein generation of a secure connection using a communication protocol associated with the network resource may include use of network resource communication code.

Example 5 may include the apparatus of example 4, wherein the network resource communication code may be to execute in a runtime environment.

Example 6 may include the apparatus of example 5, wherein the network resource communication code may include Java code.

Example 7 may include the apparatus of any of examples 1-6, wherein the security tunnel generator may be further to confirm that the peripheral may be allowed for secure connection to the network resource.

Example 8 may include the apparatus of example 7 wherein the security tunnel generator may be to confirm that the peripheral may be approved through comparison of the peripheral to a whitelist of approved peripherals.

Example 9 may include the apparatus of example 7 wherein the security tunnel generator may be to confirm that the peripheral may be not disapproved through comparison of the peripheral to a blacklist of unapproved peripherals.

Example 10 may include the apparatus of any of examples 1-9, wherein the security tunnel generator may be to receive the request through receipt of an interrupt.

Example 11 may include the apparatus of any of examples 1-10, wherein the transaction may be a financial transaction.

Example 12 may include the apparatus of example 11, wherein the networked resource may be a resource of a financial institution.

Example 13 may include the apparatus of example 11, wherein the peripheral may be a credit card reader.

Example 14 may include one or more non-transitory computer-readable media containing instructions written thereon that, in response to execution a computing system, cause the computing device to facilitate secure transactions. The instructions may cause the computing system to receive a request from a peripheral to perform a transaction with an external network resource. The instructions may also cause the computing system to generate a secure tunnel coupling the peripheral and the network resource using a trusted execution environment (TEE) of the computing system to execute processes on the computing system in a protected manner that prevents the processes being executed in the TEE from being accessed by processes executing outside of the TEE.

Example 15 may include the non-transitory computer-readable media of example 14, wherein generate the secure tunnel may include generate a secure connection between the TEE and the peripheral and generate a secure connection between the TEE and the network resource.

Example 16 may include the non-transitory computer-readable media of example 15, wherein generate a secure connection between the trusted execution environment and the network resource may include generate a secure connection using a communication protocol associated with the network resource.

Example 17 may include the non-transitory computer-readable media of example 16, wherein generate a secure connection using a communication protocol associated with the network resource may include execute network resource communication code.

Example 18 may include the non-transitory computer-readable media of example 17, wherein execute network resource communication code may include execute the network resource communication code in a runtime environment.

Example 19 may include the non-transitory computer-readable media of example 18, wherein execute the network resource communication code may include execute Java code.

Example 20 may include the non-transitory computer-readable media of any of examples 14-19, further may include confirming that the peripheral may be allowed for secure connection to the network resource.

Example 21 may include the non-transitory computer-readable media of example 20, wherein confirm that the peripheral may be allowed may include compare the peripheral to a whitelist of approved peripherals.

Example 22 may include the non-transitory computer-readable media of example 20 wherein confirm that the peripheral may be allowed may include compare the peripheral to a blacklist of unapproved peripherals.

Example 23 may include the non-transitory computer-readable media of any of examples 14-22, wherein receive the request may include receive an interrupt.

Example 24 may include the non-transitory computer-readable media of any of examples 14-23, wherein the transaction may be a financial transaction.

Example 25 may include the non-transitory computer-readable media of example 24, wherein the network resource may be a resource of a financial institution.

Example 26 may include the non-transitory computer-readable media of example 24, wherein the peripheral may be a credit card reader.

Example 27 may include a computer-implemented method for facilitating secure transactions. The method may include receiving, by a computing system, a request from a peripheral to perform a transaction with an external network resource. The method may also include generating, using a trusted execution environment (TEE) of the computing system to execute processes on the computing system in a protected manner that prevents the processes being executed in the TEE from being accessed by processes executing outside of the TEE, a secure tunnel coupling the peripheral and the network resource.

Example 28 may include the method of example 27, wherein generating the secure tunnel may include generating a secure connection between the TEE and the peripheral and generating a secure connection between the TEE and the network resource.

Example 29 may include the method of example 28, wherein generating a secure connection between the trusted execution environment and the network resource may include generating a secure connection using a communication protocol associated with the network resource.

Example 30 may include the method of example 29, wherein generating a secure connection using a communication protocol associated with the network resource may include executing network resource communication code.

Example 31 may include the method of example 30, wherein executing network resource communication code may include executing the network resource communication code in a runtime environment.

Example 32 may include the method of example 31, wherein executing the network resource communication code may include executing Java code.

Example 33 may include the method of any of examples 27-32, wherein the method further may include confirming, by the computing device, that the peripheral may be allowed for secure connection to the network resource.

Example 34 may include the method of example 33, wherein confirming that the peripheral may be allowed may include comparing the peripheral to a whitelist of approved peripherals.

Example 35 may include the method of example 33 wherein confirming that the peripheral may be allowed may include comparing the peripheral to a blacklist of unapproved peripherals.

Example 36 may include the method of any of examples 27-35, wherein receiving the request may include receiving an interrupt.

Example 37 may include the method of any of examples 27-36, wherein the transaction may be a financial transaction.

Example 38 may include the method of example 37, wherein the network resource may be a resource of a financial institution.

Example 39 may include the method of example 37, wherein the peripheral may be a credit card reader.

Example 40 may include an apparatus for facilitating secure transactions. The apparatus may include means for receiving a request from a peripheral to perform a transaction with an external network resource. The apparatus may also include means for generating, using a trusted execution environment (TEE) of the apparatus to execute processes on the computing system in a protected manner that prevents the processes being executed in the TEE from being accessed by processes executing outside of the TEE, a secure tunnel coupling the peripheral and the network resource.

Example 41 may include the apparatus of example 40, wherein means for generating the secure tunnel may include means for generating a secure connection between the TEE and the peripheral and means for generating a secure connection between the TEE and the network resource.

Example 42 may include the apparatus of example 41, wherein means for generating a secure connection between the trusted execution environment and the network resource may include means for generating a secure connection using a communication protocol associated with the network resource.

Example 43 may include the apparatus of example 42, wherein means for generating a secure connection using a communication protocol associated with the network resource may include means for executing network resource communication code.

Example 44 may include the apparatus of example 43, wherein means for executing network resource communication code may include means for executing the network resource communication code in a runtime environment.

Example 45 may include the apparatus of example 44, wherein means for executing the network resource communication code may include means for executing Java code.

Example 46 may include the apparatus of any of examples 40-45, and further may include means for confirming that the peripheral may be allowed for secure connection to the network resource.

Example 47 may include the apparatus of example 46 wherein means for confirming that the peripheral may be allowed may include means for comparing the peripheral to a whitelist of approved peripherals.

Example 48 may include the apparatus of example 46 wherein means for confirming that the peripheral may be allowed may include means for comparing the peripheral to a blacklist of unapproved peripherals.

Example 49 may include the apparatus of any of examples 40-48, wherein means for receiving the request may include means for receiving an interrupt.

Example 50 may include the apparatus of any of examples 40-49, wherein the transaction may be a financial transaction.

Example 51 may include the apparatus of example 50, wherein the network resource may be a resource of a financial institution.

Example 52 may include the apparatus of example 50, wherein the peripheral may be a credit card reader.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus, comprising:
   one or more computer processors;
   that implement a trusted execution environment (TEE), the TEE comprised of an execution environment wherein processes are executed on the one or more computer processors in a protected manner that prevents the processes and data associated with the processes from being accessed from outside of the TEE; and
   a secure transaction tunnel generator to:
      receive a request from a peripheral to perform a transaction with network resource external to the apparatus;
      when the peripheral is identified on a whitelist of approved peripherals, generate a secure tunnel coupling the peripheral and the network resource, using at least one of the processes being executed in the TEE; and
      when the peripheral is not identified on a blacklist of unapproved peripherals and is not identified on the whitelist of approved peripherals, allow the peripheral to perform the transaction outside of the TEE.

2. The apparatus of claim 1, wherein the secure transaction tunnel generator is to generate the secure tunnel through:
   generation of a secure connection between the at least one of the processes being executed in the TEE and the peripheral; and
   generation of a secure connection between the at least one of the processes being executed in the TEE and the network resource.

3. The apparatus of claim 2, wherein the generation of a secure connection between the at least one of the processes being executed in the TEE and the network resource comprises generation of a secure connection using a communication protocol associated with the network resource.

4. The apparatus of claim 3, wherein generation of a secure connection using a communication protocol associated with the network resource comprises use of network resource communication code.

5. The apparatus of claim 4, wherein the network resource communication code is to execute in a runtime environment.

6. The apparatus of claim 5, wherein the network resource communication code comprises Java code.

7. The apparatus of claim 1, wherein the secure transaction tunnel generator is further to confirm that the peripheral is allowed for secure connection to the network resource.

8. The apparatus of claim 7, wherein the secure transaction tunnel generator is to confirm that the peripheral is approved through comparison of the peripheral to the whitelist of approved peripherals.

9. The apparatus of claim 7, wherein the secure transaction tunnel generator is to confirm that the peripheral is not disapproved through comparison of the peripheral to the blacklist of unapproved peripherals.

10. The apparatus of claim 1, wherein the secure transaction tunnel generator is to receive the request through receipt of an interrupt.

11. The apparatus of claim 1, wherein the transaction is a financial transaction.

12. The apparatus of claim 11, wherein the network resource is a resource of a financial institution.

13. The apparatus of claim 11, wherein the peripheral is a credit card reader.

14. One or more non-transitory computer-readable media containing instructions written thereon that, in response to execution by a computing device, cause the computing device to:
   receive a request from a peripheral to perform a transaction with a network resource external to the computing device;
   generate a secure transaction tunnel, when the peripheral is identified on a whitelist of approved peripherals, coupling the peripheral and the network resource, using at least one process executed in a trusted execution environment (TEE) of the computing system, the TEE comprising an environment wherein processes, including the at least one process, are executed on the computing device in a protected manner that prevents the secured processes and data associated with the processes from being accessed from outside of the TEE, and, when the peripheral is not identified on a blacklist of approved peripherals and is not identified on the whitelist of approved peripherals, allow the peripheral to perform the transaction with the computing device outside of the TEE.

15. The non-transitory computer-readable media of claim 14, wherein generate the secure transaction tunnel comprises:

generate a secure connection between the at least one process in the TEE and the peripheral; and generate a secure connection between the at least one process in the TEE and the network resource.

16. The non-transitory computer-readable media of claim 15, wherein generate a secure connection between the at least one process in the trusted execution environment and the network resource comprises generate a secure connection using a communication protocol associated with the network resource.

17. The non-transitory computer-readable media of claim 16, wherein generate a secure connection using a communication protocol associated with the network resource comprises execute network resource communication code.

18. The non-transitory computer-readable media of claim 17, wherein execute network resource communication code comprises execute the network resource communication code in a runtime environment.

19. The non-transitory computer-readable media of claim 18, wherein execute the network resource communication code comprises execute Java code.

20. The non-transitory computer-readable media of claim 14, further comprising confirming that the peripheral is allowed for secure connection to the network resource.

21. The non-transitory computer-readable media of claim 20, wherein confirm that the peripheral is allowed comprises compare the peripheral to a whitelist of approved peripherals or a blacklist of unapproved peripherals.

22. The non-transitory computer-readable media of claim 14, wherein receive the request comprises receive an interrupt.

23. A computer-implemented method, the method comprising:

receiving, by a computing system, a request from a peripheral to perform a transaction with a network resource external to the computing system;

generating a secure transaction tunnel, when the peripheral is identified on a whitelist of approved peripherals, coupling the peripheral and the network resource, using at least one process executing in a trusted execution environment (TEE) of the computing system, the TEE comprising an environment wherein processes, including the at least one process, are executed on the computing system in a protected manner that prevents the processes and data associated with the processes from being accessed from outside of the TEE, and, allowing, when the peripheral is not identified on a blacklist of approved peripherals and is not identified on the whitelist of approved peripherals, the peripheral to perform the transaction with the computing system outside of the TEE.

24. The method of claim 23, wherein generating the secure transaction tunnel comprises:

generating a secure connection between the at least one process in the TEE and the peripheral; and generating a secure connection between the at least one process in the TEE and the network resource.

25. The method of claim 23, wherein the method further comprises confirming, by the computing system, that the peripheral is allowed for secure connection to the network resource.

* * * * *

UNITED STATES PATENT AND TRADEMARK OFFICE
CERTIFICATE OF CORRECTION

PATENT NO. : 10,496,974 B2
APPLICATION NO. : 14/668715
DATED : December 3, 2019
INVENTOR(S) : Mingqiu Sun et al.

Page 1 of 1

It is certified that error appears in the above-identified patent and that said Letters Patent is hereby corrected as shown below:

In the Claims

Column 14
Line 6, "action with network resource..." should read – "action with a network resource ..."

Signed and Sealed this
Eleventh Day of February, 2020

Andrei Iancu
*Director of the United States Patent and Trademark Office*